July 28, 1959    W. J. PURCHAS, JR    2,897,020
JOURNAL BEARING ASSEMBLY
Filed Feb. 10, 1958
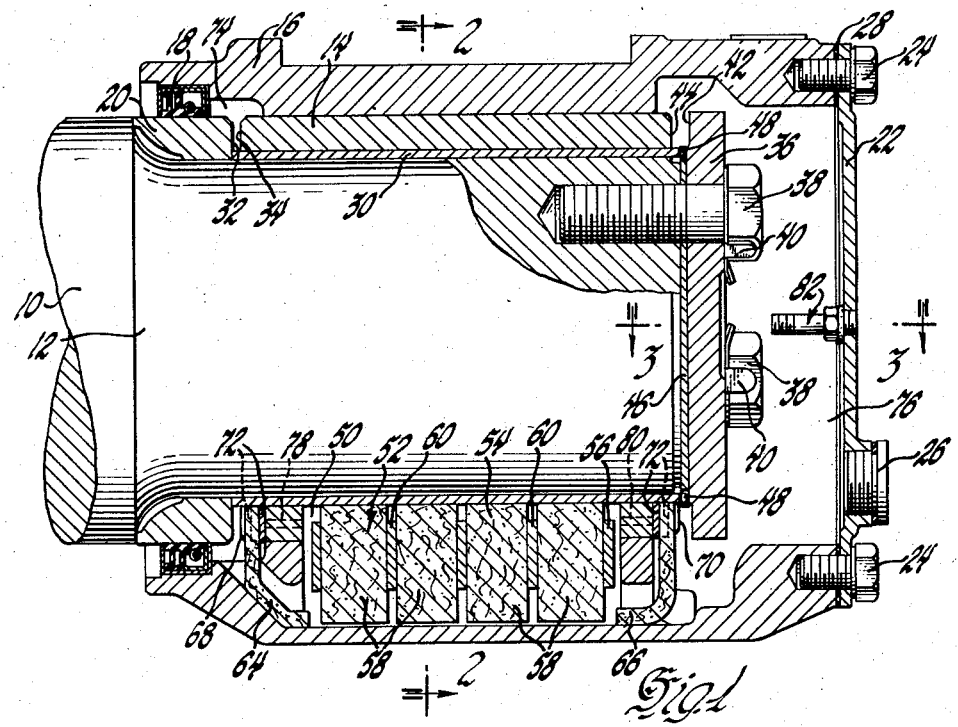
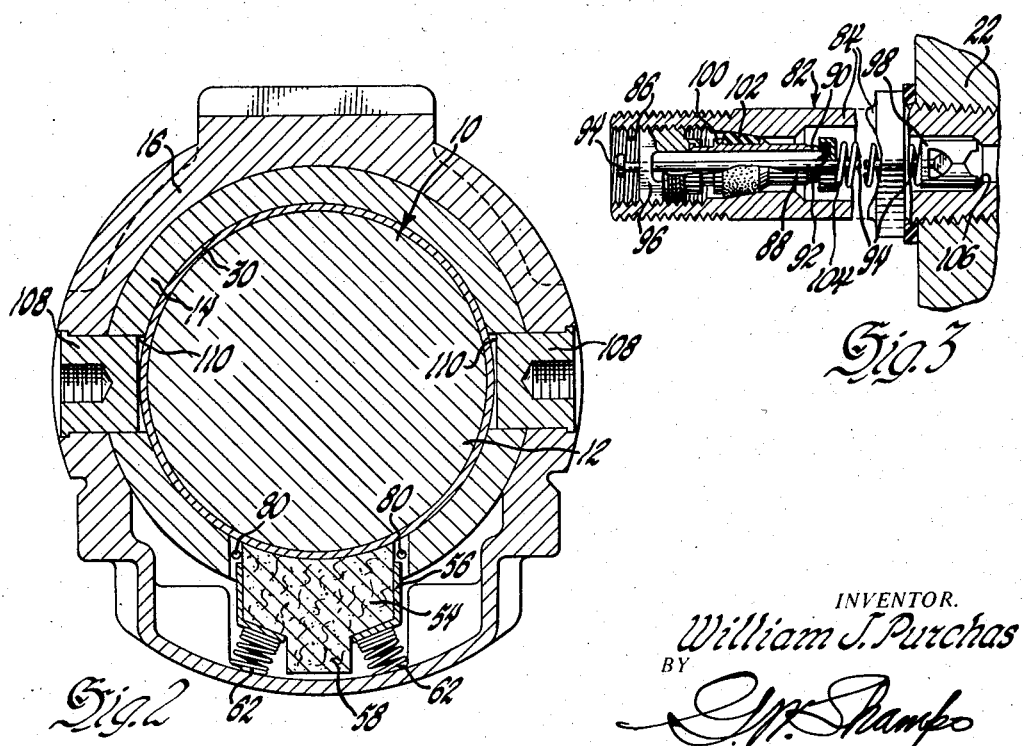
INVENTOR.
William J. Purchas
BY
ATTORNEY

United States Patent Office 2,897,020
Patented July 28, 1959

2,897,020
JOURNAL BEARING ASSEMBLY

William J. Purchas, Jr., Carmel, Ind., assignor to General Motors Corporation, Detroit, Mich., a corporation of Delaware Application February 10, 1958, Serial No. 714,157

2 Claims. (Cl. 308—88)

This invention relates generally to journal bearing assemblies and more particularly to an improved composite unit or cartridge type bearing assembly adapted for use on railway car journals.

A journal bearing assembly, such as disclosed in the co-pending United States patent application Serial No. 566,460, filed February 20, 1956, in the name of Earl J. Clark, and which is owned by the assignee of the present invention, is particularly valuable for use on railway passenger and freight cars wherein two-directional lateral thrust is encountered. In operation, railway cars exhibit lateral thrust in two directions, the duo-directional lateral thrust being more predominant in loosely constructed railway freight cars. Superior performance in the operation of journal bearing assemblies in railway cars is obtained if the bearing assembly has appropriate stops included on each end of the bearing to inhibit excessive lateral movement of the journal. Excessive lateral movement is particularly unsatisfactory since it results in an undesirable side sway of the railway car and substantially increases wear of the journal bearing. Moreover, this movement functions as a pumping action within the journal bearing assembly whereby the tendency for loss of oil through the housing seals is increased.

In addition to the pumping action of the journal increased temperatures within the housing correspondingly raise pressures therein which induce a further loss of lubricant through the housing seals. Although a filtered breather opening in the housing serves to relieve pressure differentials between the housing and atmosphere, I have found that under some operating conditions the breather opening in the housing detrimentally affects the bearing assembly.

The above-mentioned bearing assembly, the subject of United States patent application Serial No. 566,460, reduces side sway of the railway car, overall journal bearing wear, and loss of lubricant through the housing seals. However, many railway cars on which this bearing assembly is used are periodically subjected to an automatic washing apparatus. Passenger railway cars, for example, on which this assembly has been used are frequently subjected to automatic washing employing high-pressure hot water and steam cleaning sprays. It has been found that such high pressure sprays can readily penetrate a filtered breather and thereby introduce water into the bearing housing. The moisture present within the housing subsequently causes corrosion within the housing, deleteriously affecting the bearing assembly.

In especially humid weather, free passage of air to and from the interior of the housing is particularly undesirable. Moisture-laden air passing freely throughout the assembly is especially conducive to corrosion. Further, such an atmosphere readily deposits its moisture during cool periods, wherein water is introduced into the bearing housing.

Moreover, in very arid areas through which a railway car may travel, the filter is not sufficient to remove all the suspended particles from the air which passes into the cartridge. In such instances, heavily-laden, dust-filled air will retain a portion of the dust therein after passing through the filter, introducing a fine abrasive into the bearing housing.

It is therefore an object of this invention to provide a journal bearing assembly having an improved means for inhibiting loss of lubricant from the assembly housing. The invention also provides an improved construction for such a bearing assembly in which differential pressures between the interior of the housing and the atmosphere are relieved without introducing undesirable substances into the housing. By means of the present invention an improved construction of a journal bearing assembly is provided which permits several separate chambers to breath freely within a closed and sealed housing to preclude the loss of lubricant due to the pumping action of the journal while simultaneously preventing entrance of moisture and dust into the assembly housing.

The invention contemplates attaining these and other advantages by positioning the bearing in a closed housing between a pair of separated thrust members, means being provided in the housing for lubrication of the bearing at a plurality of spaced apart points. Chambers which are formed in the bottom sump of the housing at the inner and outer ends of the journal are interconnected and accessible to a spring-biased valve in the housing end wall.

Other objects, features and advantages of the present invention will be apparent from the following description of a preferred embodiment thereof and from the drawing, in which:

Figure 1 is a longitudinal sectional view, partly in elevation, through a journal bearing assembly;

Figure 2 is a cross-sectional view along the line 2—2 of Figure 1; and

Figure 3 is an enlarged fragmentary sectional view along the line 3—3 of Figure 1.

In the drawing, an axle 10 having a journal portion 12 is rotatably supported within a bearing 14. A housing 16 surrounds the journal bearing assembly and is provided with an annular oil seal 18 at its inner end in order to preclude the loss of lubricant from the rear thereof. As shown on the drawing, the seal 18 contacts the smooth peripheral surface of a thrust ring 20 so as to extend the life of the seal. The outer end of the housing 16 is provided with a thin, lightweight, stamped metal cover plate 22 which is removably secured to the housing by means of a plurality of threaded bolts 24. As shown on the drawing, a removable plug 26 is provided in the cover plate 22 to enable the addition of lubricant to the housing 16. Likewise, a sealing gasket 28 is positioned between the body of the housing 16 and the cover plate 22.

As is shown in Figures 1 and 2, the end of the axle journaled within the bearing 14 is provided with a hardened wear-resistant surface, shown on the drawing as a sleeve member 30. The outer end of sleeve 30 extends beyond the end of the axle for a purpose more fully set forth hereinafter, the sleeve 30 being affixed to the journal 12 so as to be rotatable therewith. This may be accomplished in any suitable manner, such as by shrink-fitting the sleeve 30 on the journal 12. A secondary mechanical lock may be used between the members in a manner disclosed hereinafter in order to safety the connection therebetween.

The end play of the journal 12 within the bearing is limited by the provision of a pair of stops positioned on the journal end 12 of the axle 10, operative on the inner and outer ends of the bearing 14. As shown on the drawing, a thrust ring 20 is shrink-fitted on the inner end portion of the journal 12 in such position as to present a hardened face 32 spaced apart from and adapted for cooperative action with the inner end 34 of the bearing 14. Similarly, a thrust plate 36 is removably secured on the outer end of the axle 10 by means of a plurality of bolts 38, the bolts being safetied against loosening under operating conditions by any suitable means such as lock washers 40. The hardened thrust surface 42 of thrust plate 36 is likewise spaced apart from the adjacent outer end surface 44 of the bearing 14 in order to permit a controlled amount of end play, the desired spacing being obtained by a spacer plate 46 positioned between thrust plate 36 and the end surface 44 of the journal 12. A plurality of spaced apart ears 48 are formed on the periphery of the plate in such position as to engage with receiving slots formed in the outer end portion of the sleeve 30 extending beyond the journal end surface. In this manner, the sleeve 30 is mechanically locked and safetied to the journal 12.

The lubrication of the contacting surfaces of the bearing and the sleeve is achieved in the manner clearly shown in Figures 1 and 2. An opening 50 is provided in the lower portion of the bearing 14, the opening extending longitudinally between end portions of the bearing. A wick-type lubricator 52 is positioned within the lower portion of the housing 16 and extends from the lubricant reservoir therein through the opening 50 into contact with the surface of sleeve 30, lubricant being drawn up through the wick material by capillary action. As shown in Figures 1 and 2, the lubricator consists of a plurality of felt pads 54 positioned within a holder 56, the bottom portion 58 of the pads 54 extending through the holder 56 into the lubricant. A plurality of separator plates 60 are positioned between the separate pads 54, the combination of pads 54 and separator plates 60 being retained in fixed position by means of the holder 56. The lubricator 52 is maintained against the sleeve 30 with a desired amount of pressure by means of a plurality of springs 62.

Similarly, lubrication of the thrust surfaces 32 and 42 and the end surfaces of the bearing 34 and 44 is provided by means of a wick-type lubricator. As shown in Figure 1, wicks 64 and 66 extend from the lubricant reservoir in the bottom portion of the housing 16 up into grooves 68 and 70 formed, respectively, in the lower end surfaces 34 and 44 of the bearing. The wicks 64 and 66 are removably retained within grooves 68 and 70 by means of a snap-in type clip 72, the sides of which clamp into the wicks. In this manner the lubricators are maintained in operative position while at the same time being readily removable for replacement.

Excess lubricant from the thrust ring 20 and the bearing end surface 34 is collected in an annular channel 74 formed at the inner end of the housing 16 by the housing, the oil seal 18, the thrust ring 20 and bearing 14. The lubricant, collected in this manner, is conducted into the lower portion of housing 16. In order to preclude the loss of lubricant from channel 74 due to pumping action caused by axial movement of the journal 12 in the bearing assembly, I have found it necessary to interconnect the channel 74 with the chamber 76 formed at the front portion of the housing. As shown in Figures 1 and 2, this interconnection is made possible by providing interconnecting channels 78 and 80 in the lower portion of the bearing member 14.

Pressure build-up within the housing, causing loss of lubricant through the housing seals, is inhibited by means of a relief valve 82 in the metal cover plate 22. A one-way relief valve 82 relieves pressure build-up in the housing 16 but closes the housing to the entrance of dirt, water, moisture-laden air, etc. A typical relief valve which can be used is shown in Figure 3. The valve 82 comprises an annular cylindrical housing 84 having an axial central bore 86 with a valve core assembly therein. A tubular valve seat member 88 in the valve core assembly has a circumferential knife edge 90 thereon which axially abuts a circular rubber washer 92 to close the valve. The rubber washer 92 is secured and sealed to a metal plunger pin 94 which runs axially therethrough. A bridge assembly 96 and spring cup 98 located within the annular housing 84 guide the central axially extending plunger pin 94. Closure of the central bore 86 of the valve housing 84 around the tubular valve 88 is effected by means of a swivel plug 100 having a resilient wedge fit washer 102 on its outer surface.

The rubber washer 92, secured to the plunger pin 94, is biased into contact with the circular knife edge 90 of the valve seat 88 by a spring 104 to effect closure of the valve. As the valve core assembly is inserted in the housing 84, the spring cup or lower plunger pin guide 98 abuts a circumferential radial wall 106 on the surface of the central bore 86 before the core assembly is fully inserted. In completing the insertion, the remainder of the assembly is forced against the spring 104, thereby compressing it between the spring cup 98 and the rubber washer 92. The force of the compressed spring 104 against the rubber washer 92 urges the washer into contact with the circular knife edge 90 to close the valve.

A suitable spring 104 is employed that will bias the rubber washer 92 against the knife edge 90 of the valve seat at a predetermined pressure. In general, it is preferred to employ a spring which will permit the valve to open under an air pressure of six to nine pounds per square inch. Air pressure acting on the rubber washer 92 through the interior of the tubular valve seat 88 opens the valve to permit passage of air therethrough. Excessive pressure build-up is thereby inhibited. Excessive loss of lubricant through undesirable pressure build-up due to the pumping action of the journal 12 in the separate chambers 74 and 76 is further inhibited by means of the interconnecting channels 78 and 80 to further provide for effective pressure relief.

As is clearly disclosed on the drawing, the bearing is in intimate contact with the housing over the greater portion of its surface. In this manner the dissipation of heat generated in the bearing is greatly facilitated. As is shown in Figure 2, the bearing 14 is locked to the housing 16 by means of a pair of press-fitted steel dowel members 108. Both the bearing 14 and the housing 16 are provided with correspondingly positioned openings for the reception of the dowels 108. Inasmuch as the bearing must withstand thrust from two directions in addition to withstanding the frictional drag due to the rotation of the journal 12 therein, the dowels 108 are relatively large diameter members and are so dimensioned as to extend through substantially the whole thickness of the bearing 14. However, since the opening in the bearing extends completely through the member, it is apparent that a chamber 110 is formed within the opening between the sleeve 30 and the inner end of the dowels 108. These chambers 110 function as reservoirs for excessive lubricant and lubricant vapors thus assuring adequate lubrication of the journal 12.

From the foregoing, it will be clear that the present construction incorporates a housing having a removable cover plate, which housing surrounds the journal. Loss of lubricant from the housing is substantially eliminated by the provision of oil seals between the housing and the axle, as well as between all separate and separable portions thereof. The use of an annular bearing maintains proper journal and bearing alignment, as distinguished from conventional designs which incorporate a sectional pad-type bearing in which the journal is free to roll out of the bearing under impact conditions. The use of a hardened and replaceable sleeve substantially reduces wear and scoring of the journal. Effective lubrication of the bearing is achieved by means of a wick maintained in contact with the journal under controlled pressure. Adequate lubrication is assured by the provision of auxiliary oil reservoirs positioned about the surface of the journal. Journal end play control is achieved through the use of a pair of spaced apart, hardened thrust members operating on the ends of the bearing, the thrust surfaces being lubricated by readily removable wicks. A cool running bearing is achieved through the use of an annular bearing having a large area of contact with the housing for good heat transfer between the members. The proximity of lubricant to the bearing and the splashing of lubricant thereon likewise aids in the transfer of heat from the bearing to the housing.

The loss of lubricant is minimized through the use of a relief valve in the housing with which the separate chambers in the housing communicate by means of interconnecting passages. By means of the relief valve an essentially sealed unit construction of the bearing is achieved which provides for reducing undesirable pressure build-up in the housing yet inhibits the entrance of moisture, dust and other damaging materials into the closed bearing housing.

While I have disclosed my invention by means of a preferred embodiment, it should be understood that such modifications thereof as may be apparent to those skilled in the art are within the intended scope of the claims which follow.

I claim:

1. A journal and bearing assembly comprising an axle, a journal on said axle having a hardened wear-resistant sleeve secured on the surface thereof, an annular bearing positioned about said sleeve, the lower portion of said bearing having an opening therein, a wick-type lubricator positioned in contact with said sleeve through said opening, a thrust ring positioned on said axle adjacent the inner end of said sleeve, a thrust plate positioned on the outer end of said journal, a spacer plate interposed between said thrust plate and the end of said journal, at least one ear formed integrally with said spacer plate and engaged with correspondingly positioned slots formed in the end of said sleeve, said bearing being positioned between said ring and said plate with the ends thereof in alignment with a surface of said ring and said plate, a housing surrounding said journal, bearing and lubricator, an oil seal provided between the inner end of said housing and said ring to preclude loss of lubricant, a pair of wick-type lubricators positioned within said housing adjacent the thrust surfaces of said ring and said thrust plate for lubricating said surfaces, a spring clip secured to the upper end of said ring and plate lubricators, said clip and lubricator being adapted to be snapped into position within a groove formed on the lower end surfaces of said bearing, said housing being closed so as to inhibit free exchange of atmosphere therein wherein said journal and said bearing assembly form substantially a sealed unit, at least one passage extending from end-to-end of said bearing for the purpose of interconnecting the chambers formed at the inner and outer ends of said housing and separated by said bearing, and a spring biased relief valve in said housing at its outer end for reducing pressure build-up in said chambers.

2. A journal and bearing assembly comprising an axle, a journal on said axle having a hardened wear-resistant sleeve secured on the surface thereof, an annular bearing positioned about said sleeve, the lower portion of said bearing having an opening therein, a wick-type lubricator positioned in contact with said sleeve through said opening, a thrust ring positioned on said axle adjacent the inner end of said sleeve, a thrust plate positioned on the outer end of said journal, a spacer plate interposed between said thrust plate and the end of said journal, at least one ear formed integrally with said spacer plate and engaged with correspondingly positioned slots formed in the end of said sleeve, said bearing being positioned between said ring and said plate with the ends thereof in alignment with a surface of said ring and said plate, a housing surrounding said journal, bearing and lubricator, an oil seal provided between the inner end of said housing and said ring to preclude loss of lubricant, a pair of wick-type lubricators positioned within said housing adjacent the thrust surfaces of said ring and said thrust plate for lubricating said surfaces, a spring clip secured to the upper end of said ring and plate lubricators, said clip and lubricator being adapted to be snapped into position within a groove formed on the lower end surfaces of said bearing, said housing being closed so as to inhibit exchange of atmosphere therein wherein said journal and said bearing assembly form substantially a sealed unit, a passage extending axially from end-to-end of said bearing for the purpose of interconnecting the chambers formed at the inner and outer ends of said housing and separated by said bearing, and a spring-biased one-way relief valve in the outer end of said housing for removing excess pressure in said chamber on said outer end of said housing when said pressure exceeds about six to nine pounds per square inch.

References Cited in the file of this patent

UNITED STATES PATENTS

| 1,416,884 | Schmidt | May 23, 1922 |
| 2,283,871 | Norelius | May 19, 1942 |
| 2,720,431 | Browne et al. | Oct. 11, 1955 |
| 2,785,020 | Browne | Mar. 12, 1957 |